(12) United States Patent
Goldsack (10) Patent No.: US 7,363,312 B2
(45) Date of Patent: Apr. 22, 2008

(54) COMBINING DATA DESCRIPTIONS

(75) Inventor: Patrick Goldsack, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 651 days.

(21) Appl. No.: 10/613,151

(22) Filed: Jul. 3, 2003

(65) Prior Publication Data

US 2005/0076046 A1    Apr. 7, 2005

(30) Foreign Application Priority Data

Jul. 4, 2002    (GB)    .................... 0215464.9

(51) Int. Cl.
*G06F 7/00*    (2006.01)
(52) U.S. Cl. ...................... 707/102; 707/100
(58) Field of Classification Search .............. 707/102, 707/100, 1
See application file for complete search history.

(56) References Cited

U.S. PATENT DOCUMENTS 5,491,819 A * 2/1996 Fatzinger et al. .............. 707/8
6,009,432 A * 12/1999 Tarin ........................... 707/10
6,754,666 B1 * 6/2004 Brookler et al. ............ 707/102

OTHER PUBLICATIONS

Patrick Goldsack, Hewlett-Packard document, "The SmartFrog Language Reference," Version 1, pp. 1-22, no date.

* cited by examiner

*Primary Examiner*—Sam Rimell
*Assistant Examiner*—Mellissa M Chojnacki
(74) *Attorney, Agent, or Firm*—Ladas & Parry, LLP (57) ABSTRACT

A method embodied in a computer program product for combining first and second attribute sets each comprising at least one attribute and value pair by which a named attribute is assigned a value that comprises one of a end value and a further attribute set involves carrying out a merge operation that combines the attribute and value pairs of the first and second attribute sets according to their levels in respective attribute trees with conflicts arising between attributes having the same path in each tree being resolved, on a top-down basis, according to predetermined rules.

12 Claims, 9 Drawing Sheets

COMBINING DATA DESCRIPTIONS

FIELD OF THE INVENTION

The present invention relates to data description languages and, more particularly to the combining together of attribute sets used in such languages.

BACKGROUND OF THE INVENTION

There are a variety of languages designed or used for data description, including for example: SQL, XML, CIM, and Hewlett-Packard SmartFrog Version 1. Each of these languages has a different model for defining data.

In the HP SmartFrog Version 1 language, data descriptions in the form of sets of attributes are used to define resources such as computer/network/software resources.

It is an object of the present invention to increase the flexibility of data description languages based sets of attributes.

SUMMARY OF THE INVENTION

According to one aspect of the present invention, there is provided a method of combining first and second attribute sets each comprising at least one attribute/value pair by which a named attribute is assigned a value that comprises one of a end value and a further attribute set; the method comprising carrying out a merge operation by applying to the first and second attribute sets, as items-to-be-merged, a merge operator by which:

where at least one of the items-to-be-merged is a said end value, the value of the merged items is the value of a predetermined one of the items-to-be-merged; and where both items-to-be-merged are attribute sets, the value of the merged items comprises:

the attribute/value pairs, if any, of attributes that occur in only one of the items-to-be-merged, and attribute/value pairs for attributes, if any, occurring in both items-to-be-merged with the value of each such pair being the value resulting from the application of the merge operator to the values of the attribute appearing in each item-to-be-merged, the merge operator being recursively applied as required to merge the attribute values.

According to another aspect of the present invention, there is further provided a method of combining first and second attribute sets each comprising at least one attribute/value pair by which a named attribute is assigned a value that comprises one of a end value and a further attribute set; the method involving carrying out a merge operation that combines the attribute/value pairs of the first and second attribute sets according to their levels in their respective attribute trees with conflicts arising between attributes having the same path in each tree being resolved, on a top-down basis, according to predetermined rules.

The present invention also encompasses computer apparatus and a computer program product for use in implementing the foregoing methods of the invention.

BRIEF DESCRIPTION OF THE DRAWINGS

Embodiments of the invention will now be described, by way of non-limiting example, with reference to the accompanying diagrammatic drawings, in which.

BEST MODE FOR CARRYING OUT THE INVENTION

Resources, and in particular technical resources, are often described by a set of one or more attribute/value pairs, the or each pair comprising a named attribute to which is assigned a value. For example, a disk resource may be described by the attribute set:

```
{
    size = 30;
    sizeUnit = "GB";
    filesystem = "linux";
}
``` where: "size", "sizeUnit" and "filesystem" are three attributes to each of which a value has been assigned, and
the set is delimited by curly brackets "{}", this convention being used throughout the present specification.

The value assigned to an attribute may be a specific practical value or a default value (as in the above example), or a placeholder for a value to be subsequently assigned or simply not assigned at all where, for example, the attribute is an optional one; these types of value are generally referred to herein as "end values" as they are not further resolvable or expandable in the resource description. End values may also be specified as functions that, for example, sum values or append string values.

Frequently, an attribute is given as a value a set of one or more further attributes. One situation where this may occur is where a higher-level resource is described by a set of attributes one of which concerns a lower-level resource that is itself described by an attribute set. For example, a server "Server" including a disk may be described by Server=

```
{
    host = "defaultServerHost";
    port = 1024;
    memory = 1000000;
    maxClients = 1;
    disk =      {
                size = 30;
                sizeUnit = "GB";
                filesystem = "linux";
                }
}
```

In other words, the attributes of Server may be nested. The nesting of attributes in this way can be expressed by an attribute tree. A particular attribute in the attribute tree can be referred to by a compound name consisting of a sequence of attribute names indicating a path through the tree from the root of the tree. Thus, the "sizeUnit" attribute of "disk" in the above example can be uniquely referred to by the compound name "Server.disk.sizeUnit" using the "." convention to indicate where a component of the name is an element within the preceding component.

Figure 1:
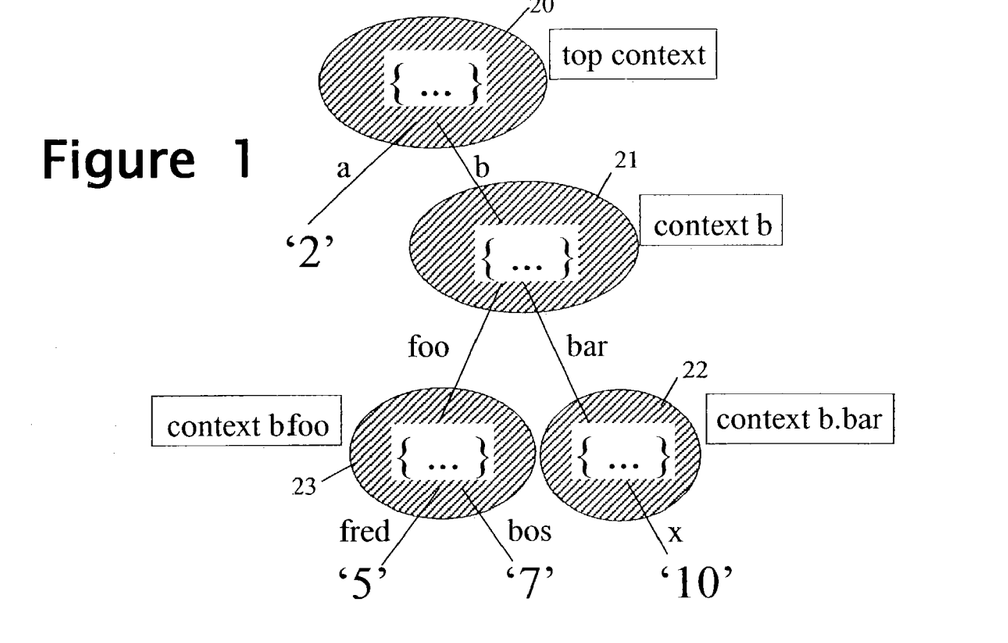
FIG. 1 is a diagram illustrating, in the form of an attribute tree, an attribute set within which further attribute sets are nested.

FIG. 1 depicts the attribute tree corresponding to the arbitrary attribute set example:

```
{
    a=2;
    b={
        foo={fred=5;
             bos=7};
        bar={x=10}
        }
}
```

The tree has three levels, namely a top level where attributes "a" and "b" are assigned values, a second level where the attributes "foo" and "bar" of the set bound to "b" are assigned values, and a third level where attributes "fred", "bos" of "foo" and attribute "x" of "bar" are assigned values.

The hatched ovals 20-23 in FIG. 1 serve to indicate naming contexts where a naming context is any collection of names introduced by the same path at one level of the attribute tree. Thus, the context 21 of "b" comprises the names "foo" and "bar" whilst the context 23 of "foo" comprises the names "fred" and "bos". The top-level, or outer, naming context 20 in this example comprises the names "a" and "b" which is also the "parent" context of the lower-level, or inner, contexts.

Rather than an attribute being assigned a value that is an end value or an attribute set, it can be bound to a "reference", that is, to a name that is a reference to another attribute. A reference comprises a (non-empty, but possibly singleton) sequence of attribute indicators, starting with one of:

- a name (indicating an attribute in the same context as the attribute to which the reference is assigned, or if such as attribute does not exist in the same context, in the parent or indeed other ancestor context with the closest enclosing context being selected if more than one contains the name),
- a root indicator indication the root of the attribute tree (indicated, for example, by the symbol "/"), or
- the parent context (indicated, for example, by the term "parent").

All subsequent attribute indicators in the sequence are determined relative to the attribute indicated by the previous attribute indicators. References can thus refer up or down the attribute tree from one location to another.

Figure 2:
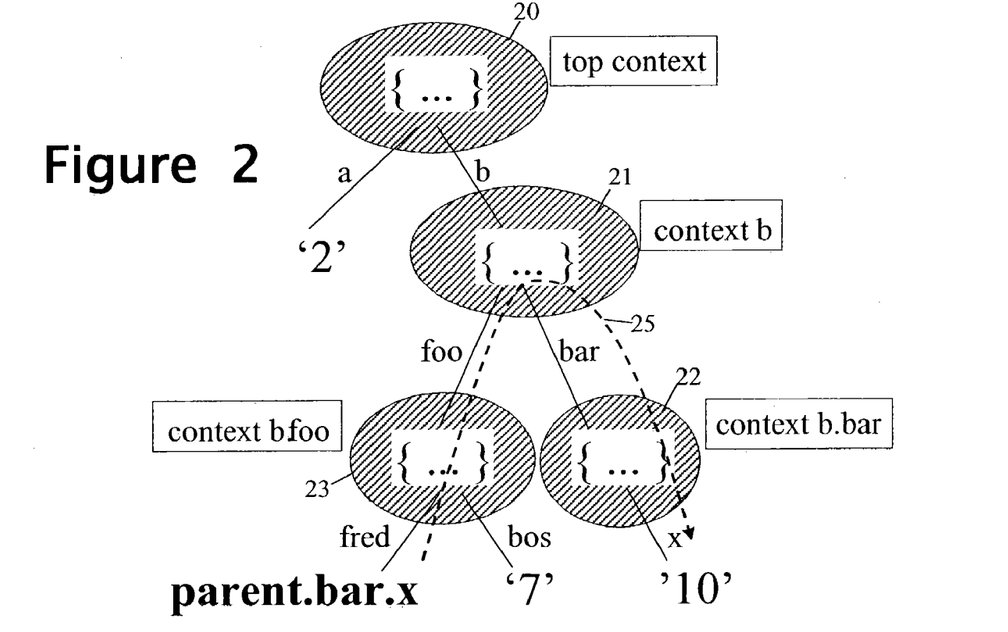
FIG. 2 is a diagram similar to FIG. 1 but with the value of one attribute being a reference to another attribute.

Use of a reference indicates that a copy of the referenced attribute should be taken. An example is:

{a=56, b={x=34, y=76}, c=b.x} where the definition of "c" as a reference to "b.x" resolves to the value 34. References are resolved in a specific context which in the example just given is the context of "b". FIG. 2 illustrates a further example of referencing—in this case, the attribute "fred" of the FIG. 1 example has been assigned reference "parent.bar.x" and resolution of this reference produces the end value of 10 (see dashed arrow 25 in FIG. 2).

There are several interesting cases that need to be defined when considering reference resolution, in particular:

1) a reference refers to another reference: in this case, in resolving the original reference, should the second reference be copied or should that reference be resolved first?
2) a reference referring to a set of attributes containing further references: should the set be copied with its references resolved, or unresolved?

Either semantics could be selected. However the choice of resolving the reference for (1) and leaving references unresolved for (2) make the most practical sense and this choice is assumed for the remainder of this description, it being understood that the present invention encompasses either semantic.

Using a reference to an existing attribute set enables that set to be combined into another set that effectively serves as a container for the referenced set—where the attribute sets define resources, the referenced resource is simply a component resource of the resource that includes the reference. In other words, the combination is a passive parent-child relationship. It would be useful to be able to combine together attribute sets in a more interactive way with top-level attributes from both sets being brought together as the top-level attributes of a new set and any overlap in attributes being resolved. For example, it would be useful to combine a set of one or more new attributes values with an existing resource description containing those attributes such that the new values replaced the existing values. It would also be useful to form a new resource definition by combining two existing resource definitions in such a way that overlap between attributes is handled in a predictable manner. Since resource descriptions are themselves attribute sets, the foregoing examples are both specific cases of the general task of combining together two attribute sets in a predictable and useful manner given the possibility of attribute overlap.

The Merge Operator (Denoted "&")

To effect the combination of two attribute sets (one or both of which may form a resource description) in a useful and reliable manner, a merge operator is defined which, given two (or more) attribute sets, produces a new attribute set that is the merge of the two (or more) given sets. The semantics for the binary case can be expressed as follows:

if not( isSet $V_1$ and isSet $V_2$)
$\quad V_1 \& V_2 = V_2$
else given $V_1 = \{I_{11}=V_{11}, ..., I_{1n}=V_{1n}, I_1=V_{1a}, ..., I_m=V_{ma}\}$ and
$\quad\quad\quad V_2 = \{I_{21}=V_{21}, ..., I_{2p}=V_{2p}, I_1=V_{1b}, ..., I_m=V_{mb}\}$
then
$\quad V_1 \& V_2 = \{I_{11}=V_{11}, ..., I_{1n}=V_{1n},$
$\quad\quad\quad\quad I_1=V_{1a} \& V_{1b}, ..., I_m=V_{ma} \& V_{mb},$
$\quad\quad\quad\quad I_{21}=V_{21}, ..., I_{2p}=V_{2p}\}$ where:
  values (including end values and sets) are represented by "V";
  attribute names are represented by "I";
  predicate "isSet" evaluates 'true' if the associated value is a set of attributes, false otherwise; and
  the specific ordering of the names in the attribute sets is not important.

Thus, the & operator collects the attributes whose names occur only in one or other set and includes them in the resultant set, and those whose names appear in both sets have an attribute whose value is the merger of their individual values. If two values are not sets, the second value dominates. By way of example, consider the merge:

{a=4; b=5} & {b=9; c=7}

Applying the above merge operator rules, gives:

{a=4; b=5&9; c=7} and the second application of the merge operator rules gives:

{a=4; b=9; c=7}

The process of fully working through the application of an initial merge operator, including the consequent recursive application of the operator, is referred to as a "merge operation" as distinct from the single application of the merge operator according to the above rules.

It is clear how the operator generalises to more than two values by, for example, considering the n-case $S_1$ & $S_2$ & $S_3$ & ... & $S_n$ as (n-1) successive applications of the binary operator to attribute sets $S_1$ to $S_n$.

( ... (($S_1$ & $S_2$) & $S_3$) & ... ) & $S_n$

The definition of the merge operator can be varied in a number of ways, including by:
  making the order of names important e.g. the attributes form an ordered set or list rather than an unordered set, the order of the resultant attribute list may be defined in some specified way from the lists given;
  instead of the right-hand value of the two values subject of the merge operation being the dominant value, a predetermined function is applied involved one or both values. Thus, for example {a=4, b=5} & {a=.+5}
resolves to:
{a=4+5, b=5}

In this case, the normal right-projection could be seen as the default use of a function whose result is the projection of its second parameter.

Figure 3:
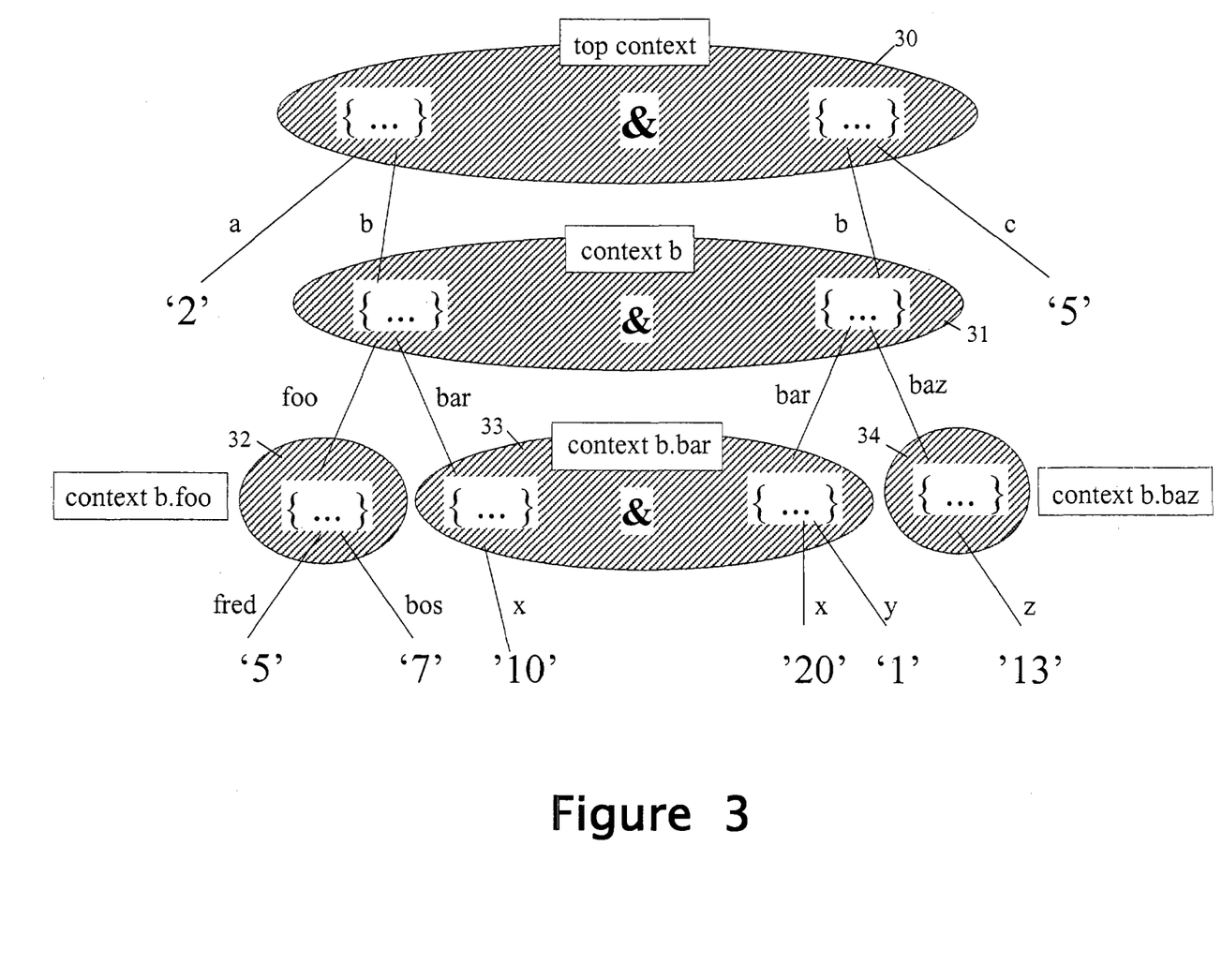
FIG. 3 is a diagram illustrating the merging of two attribute sets.

A more complex example of a merge operation effected using the basic form of the merge operator is depicted in FIG. 3 where the attribute set of FIG. 1, namely:

{
  a=2;
  b={
    foo={fred=5;
         bos=7};
    bar={x=10}
    }
} is being merged with the attribute set:

{
  c=5;
  b={
    baz={z=13};
    bar={x=20; y=1}
    }
}

The merge operation proceeds as follows:
  the first (top level) application of the merge operator gives:
    {a=2; b={foo={fred=5; bos=7};bar={x=10}}&{baz={z=13; bar={x=20;y=1}};c=5}that is, the merge operation has permeated down to the next level where the values of b from the two top-level sets now require to be merged;
  carrying out the second level merge on the values of b gives:
    {a=2; b={foo={fred=5; bos=7};bar={x=10}}&{x=20; y=1};baz={z=13}};c=5}and now the merge operation has moved down another level where the values of b.bar next need to be merged
  carrying out the merge on b.bar values gives the final result of:
    {a=2; b={foo={fred=5; bos=7};bar={x=20;y=1}; baz={z=13}};c=5}

It can be seen from FIG. 3 that the merge operator has been recursively applied as it has impacted in turn each level of the attribute tree where the two sides of the original merge have resulted in matching attributes. The FIG. 3 example also illustrates the effect of the merger operation on the naming contexts 30-34. The top-level or outer context 30 of the merge is in fact the combination of all the sets merged together at the top level (it maybe more than two). This combining of contexts also applies for lower-level or inner contexts—more particularly, all contexts with the same path are combined irrespective of which outermost set they belong to (see contexts 31 and 33).

Figure 4:
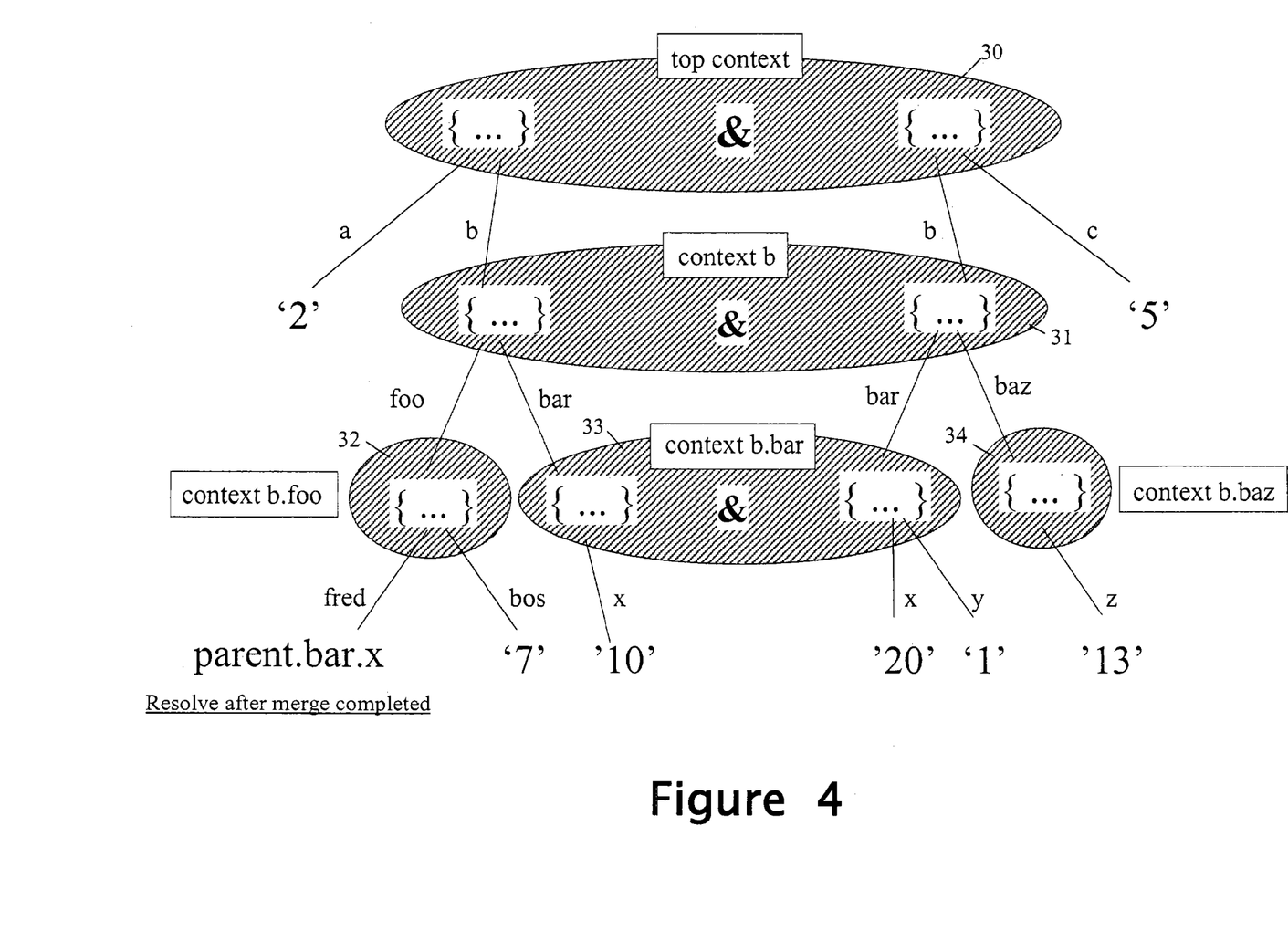
FIG. 4 is a diagram similar to FIG. 3 but with the value of one attribute being a reference to another attribute.

FIG. 4 is similar to FIG. 3 but now the first of the top-level attribute sets is that depicted in FIG. 2 rather than that of FIG. 1—that is, "b.foo.fred" is bound to the reference "parent.bar.x" rather than to the value "5". It is immediately apparent that resolution (de-referencing) of the reference will produce different results depending on whether this is done before or after the merge operation has been completed as the value of "parent.bar.x" is affected by the merge. It is more useful to apply the rule that the merge operation must be completed before the reference is resolved so that "b.foo.fred" takes on the value of"parent.bar.x" subsisting after the merge operation has been completed. In fact, this rule can be refined to be that a reference should only be resolved after all the contexts through which it traverses that involve a merge operation have been merged.

By way of a very simple example, post-merge resolution of the reference "a" for attribute "b" in the following:

{a=45; b=a} & {a=34} gives rise to a value for "b" of "34" whereas a pre-merge resolution would have given a value of "45".

Figure 5:
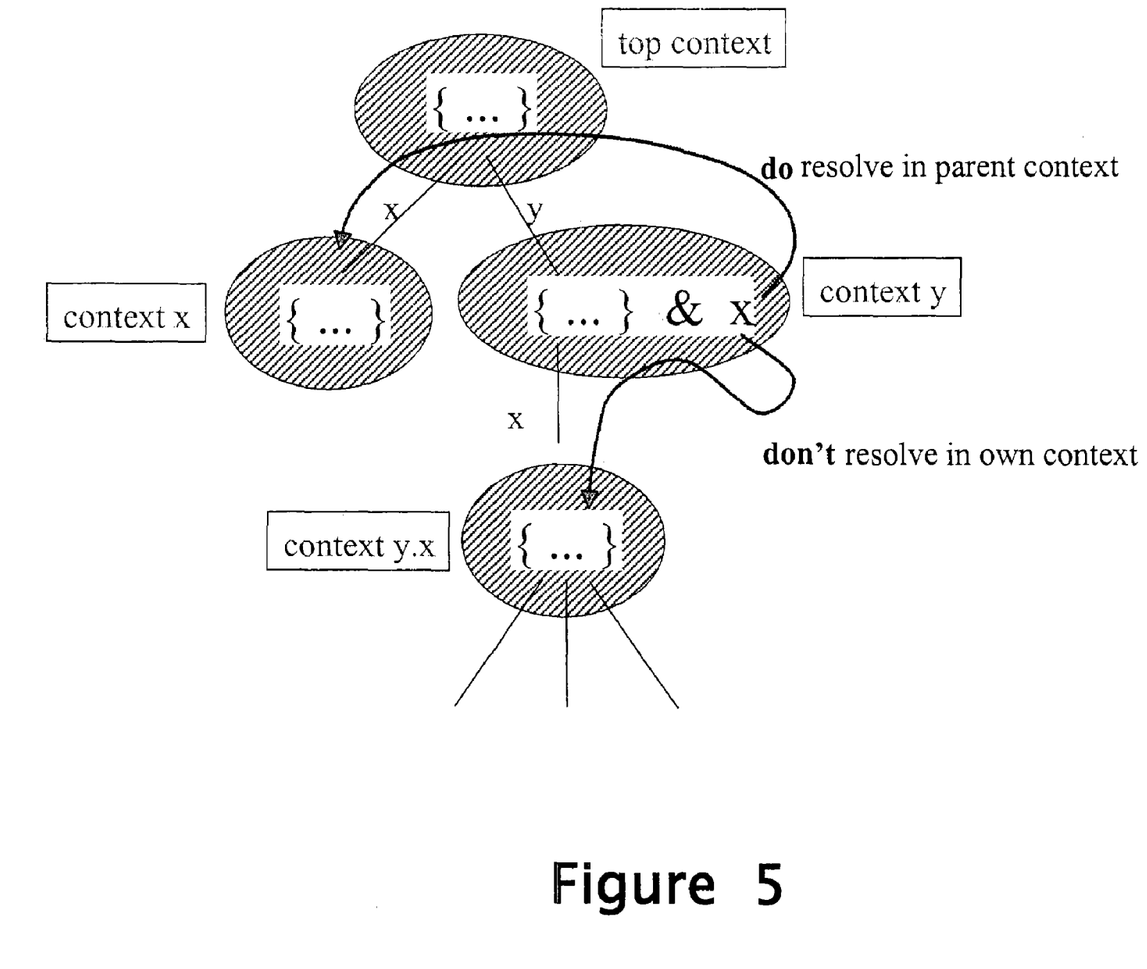
FIG. 5 is a diagram illustrating resolution of a reference during a merge operation.

Since it is also necessary to resolve a reference before the merge operator can be applied to it, a merge operation will fail if a reference that requires resolution, relies on a context to be resolved whose resolution in some (possibly indirect) way requires the reference to be resolved—i.e. there is a circular dependency on resolution ordering. Therefore, for failure not to occur, a reference occurring as a part of a merge must be resolvable, and resolved, in the parent context, never in its own. This is depicted in FIG. 5.

In general terms, the process for carrying out a merge operation between two attribute sets where references are involved is as follows:

1. find something to do and do it, where "something to do" is either:
    (a) resolve the top-level context of a merge operator, using the semantics of the merge operator given above (note that all constituent values in a merge must be party to that resolution, and none may be a reference); or
    (b) resolve a reference, so long as all the contexts through which it traverses have been resolved.
2. repeat (1) until either there is nothing left to do (success) or nothing more can be done (failure).

Figure 6A:
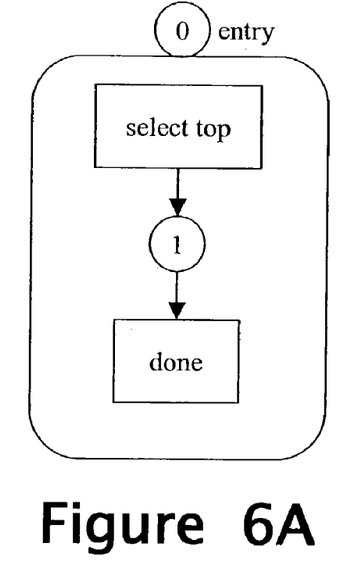
FIG. 6A is a diagram of an entry block of one implementation of the merge operation, other blocks of the implementation being shown in FIGS. 6B, C and D.
Figure 6B:
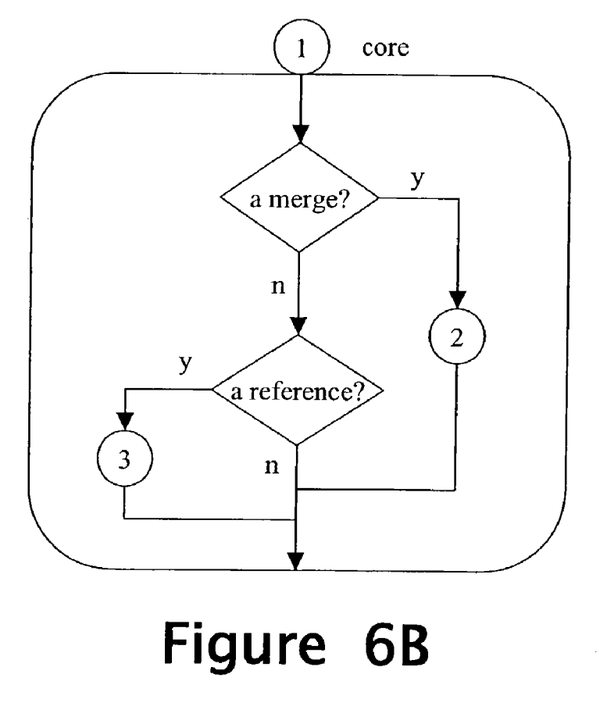
FIG. 6B is a diagram of a task selection block of one implementation of the merge operation, other blocks of the implementation being shown in FIGS. 6A, C and D.
Figure 6C:
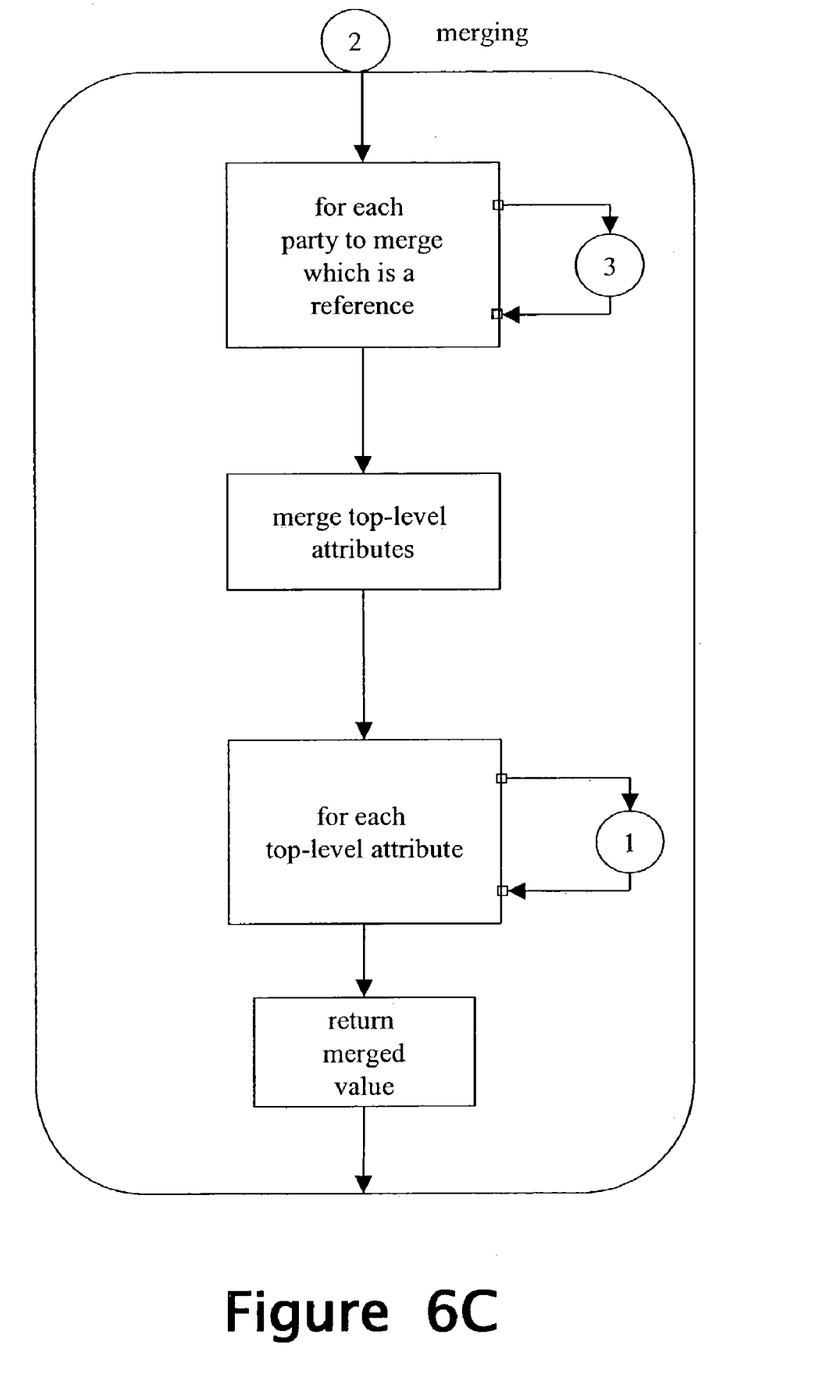
FIG. 6C is a diagram of a merge task block of one implementation of the merge operation, other blocks of the implementation being shown in FIGS. 6A, B, and D.
Figure 6D:
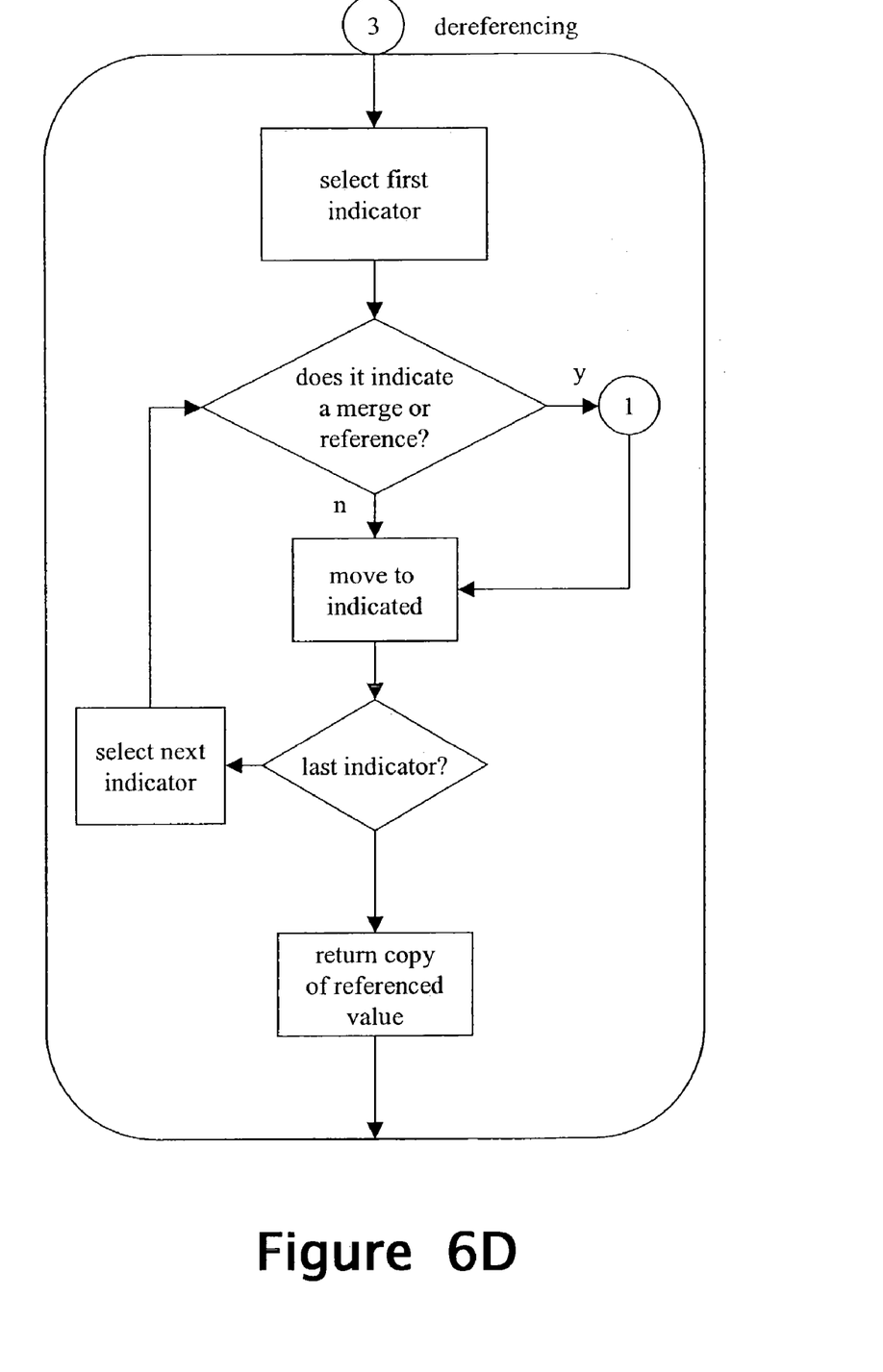
FIG. 6D is a diagram of a de-referencing task block of one implementation of the merge operation, other blocks of the implementation being shown in FIGS. 6A, B, and C.

There are a number of possible specific implementations of this process which differ from each other according to the specific orderings of the actions taken. One implementation, depicted in FIGS. 6A-D, is as follows:

0. select the outermost (topmost) context (FIG. 6A);
1. select next task—either a merge or de-referencing (FIG. 6B);
2. carry out a merge task but if a reference is encountered, suspend merge task whilst a de-referencing task carried out for the reference; following merge of top-level attributes in the current merge task, for each top-level attribute check if merge or de-reference is required and, if so, suspend current merge task and go to (1) to select appropriate new task after completion of which the suspended merge task is resumed (FIG. 6C)
3. carry out de-referencing task but if a merge or reference is encountered, suspend current de-referencing task and go to (1) to select appropriate new merge or de-referencing task and on completion of that task., resume suspended de-referencing task (FIG. 6D)

This implementation requires appropriate loop detection to detect the failure condition identified above.

Applying Conformance Predicates

It is possible to apply a conformance predicate to a resource description to check that the latter satisfies one or more specified criteria. Syntactically, application of a conformance predicate can take the following form:

V satisfying x. P[x]

where:
"V" is a value (of any type, including an attribute set) to be checked,
the keyword "satisfying" introduces the conformance predicate,
"x" introduces a name representing the value "V", and
"P[x]" is any predicate expression including "x".
The scope of x is exactly the predicate expression.

Since one or more of the attribute sets involved in a merge operation may be subject to a conformance predicate, it is important to specify how the merge operator interacts with conformance predicates.

Consider the merge of two values V and W each of which is subject of a conformance predicate:

V satisfying x. P[x]

&

W satisfying y. Q[y]

The semantics of the merge operator are defined to give the result:

(V & W) satisfying x. (P[x] and Q[x])

where "and" is logical conjunction.

Thus, where V and W are attribute sets, the attribute set resulting from the merge operation must not only contain the attribute names of each constituent attribute set (this being a characteristic of the merge operator), but must also satisfy the conjunction of the conformance predicates.

Note that the merge operator should be considered an n-ary operator, not a binary operator, since in the general expression:

V & W & X & Y where V,W,X,Y are values with possible conformance predicates, the intermediate merges may create invalid, non-conformant values that are corrected by later merges. For example:

{a=4, b=3} satisfying x. x.a>x.b

&

{a=0} satisfying x. x.a<3

&

{b=-1}

The merge of the first two is non-conformant, whereas the triple merge is conformant.

The "Extends" Predicate

It is useful to provide the above-described description language with a predicate that tests whether an attribute set (the "subject" set) is an extension of another attribute set (the "basic" set)—that is, whether the subject set is derived through the use of the merge operator from the basic set. Such a predicate (hereinafter called the "extends" predicate) would guarantee, when evaluated as true, two properties:

that the subject set contains all the attribute names of the basic set;
that all the conformance predicates of the basic set are satisfied by the subject set.

These two properties are guaranteed by the monotonicity of the merge operator with respect to these two properties—attribute names cannot be deleted and conformance predicates cannot be weakened.

The extends predicate is applied using the "satisfying" syntax described above.

By way of example, the following application of the extends predicate as a condition to be satisfied by x.bar, will evaluate as true.

{
    foo = {a = 4};
    bar = foo & {b=3}
} satisfying x. (x.bar extends x.foo)

Figure 7A:
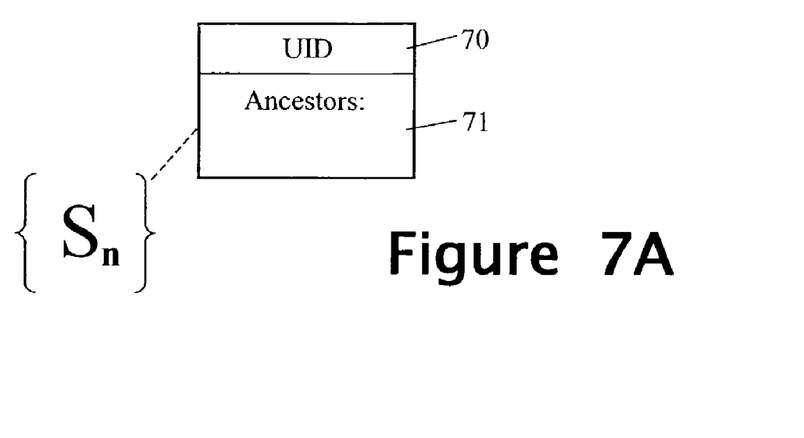
FIG. 7A is a diagram of identifiers associated with an attribute set to facilitate application of an "extends" predicate.

One possible mechanism for implementing the "extends" predicate is as follows (see also FIGS. 7A to 7C):

1. Attach to every attribute set $\{S_n\}$ both a respective unique identifier UID 70 of the instance of the attribute set, and a group 71 of identifiers of the ancestor attribute sets (FIG. 7A). Note that when defining a new attribute set (ie. one given by the { . . . } syntax), the group 71 of ancestor identifiers is empty, and the UID 70 is allocated a new unique identifier.

Figure 7B:
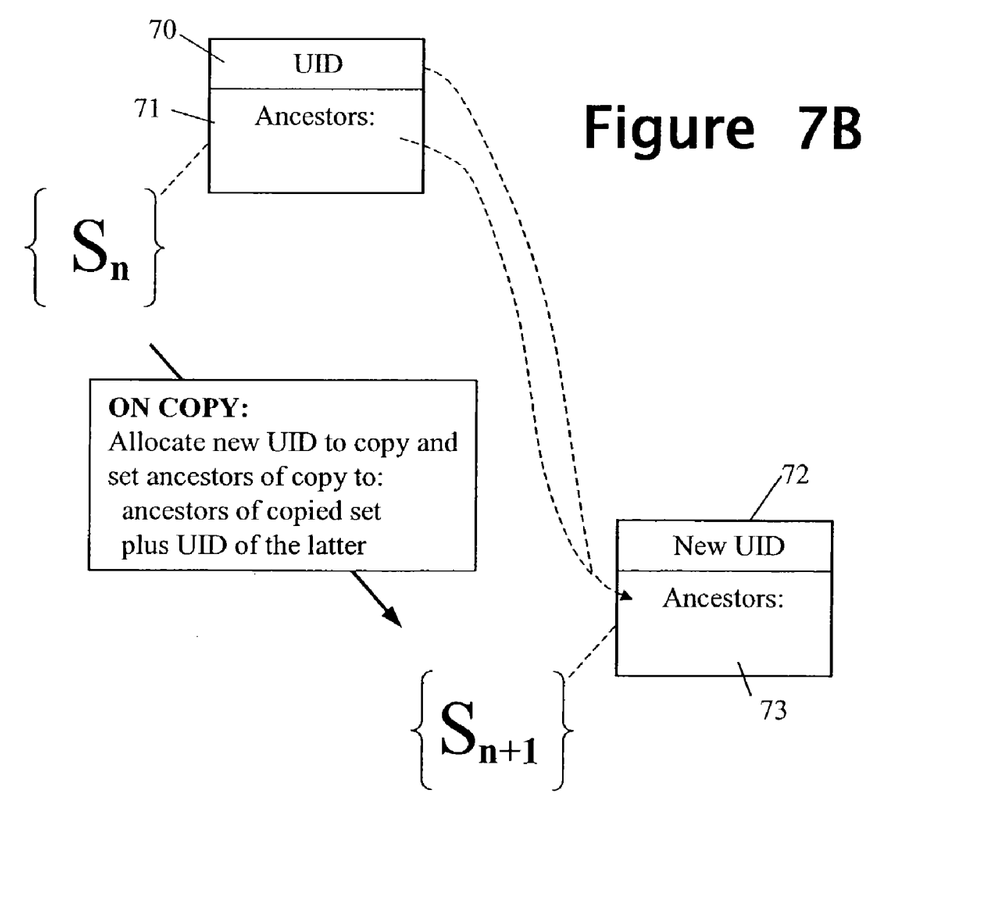
FIG. 7B is a diagram illustrating how identifiers of the FIG. 7A set are manipulated upon copying of the set.

2. When copying an attribute set $\{S_n\}$ as the result of a reference resolution then in the copy $\{S_{n+1}\}$, a new unique identifier 72 is created for the copy $\{S_{n+1}\}$ and the ancestor group 73 is formed by the ancestor group 71 of the set $\{S_n\}$ that was copied plus the UID 70 of that set $\{S_n\}$ (FIG. 7B).

Figure 7C:
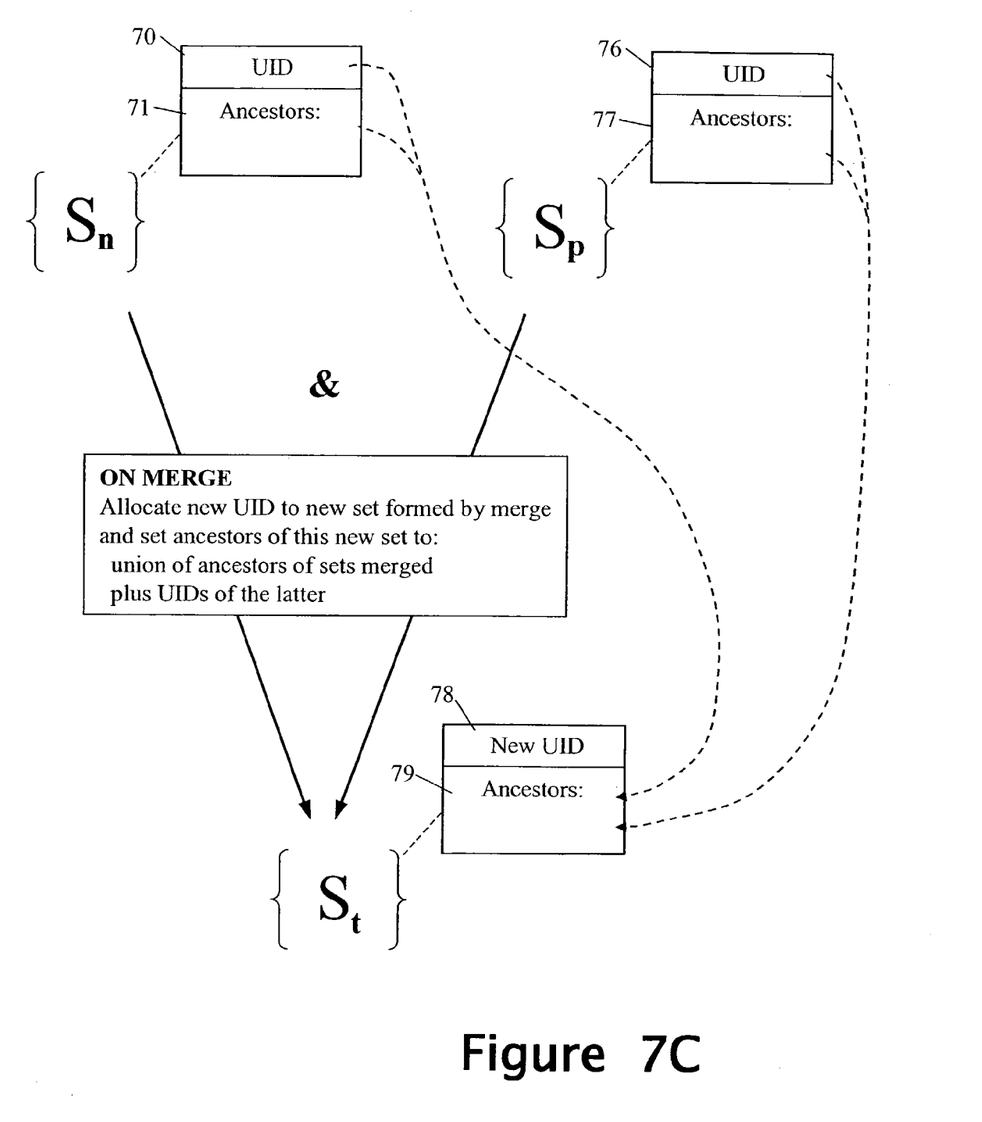
FIG. 7C is a diagram illustrating how identifiers of the FIG. 7A set and another set are manipulated upon the two sets being merged.

3. When creating a new set $\{S_r\}$ from the merge of two attribute sets $\{S_n\}$ & $\{S_p\}$, a new unique identifier 78 is created for the new set $\{S_r\}$ and the group of ancestors associated with this set is defined to be the union of the groups 71, 77 of ancestor identifiers of the attribute sets being merged, plus the separate identifiers 70 and 76 of these latter attribute sets (FIG. 7C).

4. The extends predicate can then be evaluated by comparing the group of ancestor identifiers of the basic set (after the copying caused by the reference to that set in the predicate statement) with the group of ancestor identifiers of the subject set (again, after the copying caused by the reference to that set in the predicate statement); if the latter group contains the former, then the predicate evaluates true. Note that because the sets referenced in the predicate statement are copied, the group of ancestor identifiers of each copied set contains the unique identifier of the un-copied set so that comparing these groups is adequate to test that the identifier of the basic set is contained in the ancestor group of the subject set. In fact, it is possible to implement the extends predicate such that the attribute sets to which the predicate is applied are not copied—in this case, there is no longer any need to keep the unique identifier of a set separate from its associated group of ancestor identifiers, and instead, the set identifier can be kept with the ancestor identifiers in a single group of identifiers. The predicate is then tested in the same manner as before, that is, by comparing the group of identifiers of the subject and basic sets.

EXAMPLE

The following example, though simplified to aid understanding, illustrates an application of the above-described description language (including use of the merge operator, of the "satisfying" syntax to apply conformance predicates, and of the "extends" predicate) in a real-world context, namely the specification of a computer system with four server-client pairs. The system description is followed by a commentary indicating certain features of interest. Comments in the system description itself are pre-faced by "//". The term "template" is used to refer to a resource description that is intended to be used as a model for resources of that type, with the default or place-holder values assigned to attributes in the definition of the template, being replaced for a specific resource by being merged with the attribute values to be used for that resource. A basic template can also be modified to provide a derived template that is typically a sub-type of the resource type modeled by the basic template.

```
------------- start of system description -------------
// wrap everything in a set to provide a name space for all definitions
{
    // basic disk template with default values
    Disk =
    {
        size = 30;
        sizeUnit = "GB";
        filesystem = "linux";
    } satisfying d. d.size > 0
```

```
-continued

// derived disk templates with different default values
    NTDisk = Disk & {filesystem = "NTFS";}
    UXDisk = Disk & {filesystem = "HPUX";}
    // basic server template with default values
    Server =
    {
        host = "defaultServerHost";
        port = 1024;
        memory = 1000000;
        maxClients = 1;
        disks = { } satisfying ds. (forall d in ds. d extends Disk);
    };
    // derived server templates with different default values
    Webserver = Server & {port = 80};
    DBServer =
        Server & {
            disks = {data = UXDisk & {size = 100}}
        }
    // basic client template with default values
    Client = {
        host = "defaultClientHost";
        serverHost = "";
        serverPort = 1024;
    }
    // derived client templates with different values
    WebClient = Client & {serverPort = 80}
    // template of a server/client pair with
    //       a check that the hosts and ports match
    (in case one gets changed)
    //       a pair of attributes acting as parameters
    for server host and port
    //             to the pair
    ServerClient = {
        //define a pair of values to act as parameters to the description
        theHost = "defaultServerHost";
        thePort = 1024;
        server = Server & {host = theHost; port = thePort};
        client = Client & {serverHost = theHost;
        serverPort = thePort};
    } satisfying sc. (sc.server.host = sc.client.serverHost and
                sc.server.port = sc.client.serverPort)
    SystemDescription = {
        univeralPortNo = 4242;
        pairs = {
            server1 = ServerClient &
                {thePort = universalPortNo
                theHost = "host1.hpl.hp.com"};
            server2 = ServerClient &
                {thePort = universalPortNo
                theHost = "host2.hpl.hp.com"};
            server3 = ServerClient &
                {thePort = universalPortNo
                theHost = "host3.hpl.hp.com"};
            server4 = ServerClient &
                {thePort = universalPortNo
                theHost = "host4.hpl.hp.com"};
        }
    }
}

------------- finish of system description -------------
```

The Use of the Merge Operator &.

There are several instances of the use of the merge operator throughout the above Example, these being in connection with overriding the default attributes of a template—for example in the definition of WebServer where the port is set to 80. The use of the merge to combine two independent definitions into a combined one, is not illustrated in the Example.

The application of conformance predicates.

There are three of examples of application of conformance (validation) predicates by use of the "satisfying" syntax—the most interesting being the use of the "forall" quantifier to test all members of the set in the definition of the disks of the server. This checks that all disks were derived (directly or indirectly using the merge operator &) from the definition of Disk. Note that because of the fact that the merge operator maintains the conformance predicates associated with the attributes, these conformance predicates are still applicable in the derivations of the templates. Thus the disk constraint is still in force in all the forms of server and in the definition of ServerClient and indeed in all instances of ServerClient in the definition of SystemDescription. The conformance predicates can be evaluated after completion of the merge operation.

The Extends Predicate.

As already explained, the use of the extends predicate provides a check that the set being tested (the subject set) is derived in some way (using the merge operator &) from the identified basic set . In turn this guarantees the satisfaction of two properties: (i) the subject set has at least all of the attributes of the basic set though it may have more, and (ii) the subject set satisfies the validation predicates defined as part of the basic set because the merge operator carries all these predicates through to derived sets.

The example provided here simply checks the derivation of each of the attributes of the disks of a server, checking they are derived from the Disk template (see the definition of the basic server template).

References and the Merge Operator.

In the above Example, references are used both to refer to resource-definition sets such as Disk for use as templates, and to refer to values such as universalPortNo to access some standard value.

Where a reference points to a value that is an end value or an attribute set (with or without references), then the valued is copied; where the reference points to another reference, the reference chain is followed in an attempt to resolve the reference—however, as discussed, this may not be immediately possible as resolution of the reference may involve an unresolved context in the case where application of a merge operator has not been completed.

The Example contains instances of the various different resolutions of a reference:

1) Copying a Value:

The definition of the map ServerClient has an example of an attribute definition port=thePort;

which simply copies the value of the thePort attribute to give its value (1024)

2) Copying an Attribute Set:

There are many instances of this in the Example— everywhere a set is used as a template. The most interesting case is where the set contains references, and this is true of the set formed by the resource definition ServerClient; this set is referenced four times in the SystemDescription resource defintion set. The main point to note is that in copying the set, all contained references must be left unresolved, such as the references to thePort and theHost. Otherwise, these may be set to the default values given in the template and not re-evaluated after the new values have been substituted using the merge operator &. Thus, if the references in ServerClient are resolved before this set is copied into SystemDescription, the following form results after the merge operations between the copied-in ServerClient copies and the attribute set comprising the attributes "thePort" and "theHost":

```
SystemDescription = {
    universalPortNo = 4242;
    pairs = {
        server1 = {
            theHost = "host1.hpl.hp.com";
            thePort = 4242;
            server = Server & {host = "defaultServerHost";
                port = 1024};
            client = Client & {serverHost = "defaultServerHost";
                serverPort = 1024};
        }
        etc
    }
}
``` where the items in error are shown bold. The correct result, achieved by copying the referenced set with its references unresolved, and then carrying out the merge operation is:

```
SystemDescription = {
    universalPortNo = 4242;
    pairs = {
        server1 = {
            theHost = "host1.hpl.hp.com";
            thePort = 4242;
            server = Server & {host = "host1.hpl.hp.com";
                port = 4242};
            client = Client & {serverHost = "host1.hpl.hp.com";
                serverPort = 4242};
        }
        etc
    }
}
``` the corrected values being shown in bold.

3) Chaining References.

There is an example of chaining references in the description of SystemDescription, in the use of the ServerClient—though it is somewhat indirect. Consider the system description after copying the definition of ServerClient, but before resolving all the references; the system descriptiont contains:

```
SystemDescription = {
    universalPortNo = 4242;
    pairs = {
        server1 = {
            theHost = "host1.hpl.hp.com";
            thePort = universalPortNo;
            server = Server & {host = theHost;
                port = thePort};
            client = Client & {serverHost = theHost;
                serverPort = thePort};
        }
        etc
    }
}
``` the items shown bold being the items of interest. In this case, the client's definition of "thePort" is a reference to the definition in "servers", which in turn is a reference to the value of "universalPortNo", resulting in the value "4242". This is an example of chaining, and the result is 4242.

It can be seen from the foregoing that the merge operator permits the specification of the attributes of a resource by combining attributes sets with the combination having effect not only at the top level of each set, but also at lower levels where the top-level attributes of the sets being combined overlap. This facilitates the specification of a resource using standard building blocks in the form of basic and derived templates which is of considerable advantage when specifying complex resources such as computer systems, computer networks, telecommunication systems, or a software installation. The attributes of the resource can be automatically derived from the high-level resource description by pulling the templates of referenced component resources and combining them attribute sets that specify particular values for attributes of the component resources; this process will typically be effected using a computer programmed to manipulate the high-level and component resource descriptions and apply the merge operator and conformance predicates (including the extends predicates) as described above. After the resource description has been resolved, the resultant attribute values can be applied, preferably automatically, to the actual top-level and component resources concerned thereby to configure them in accordance with the resolved high-level resource description.

It is to be understood that the merge operator can be used to combine attribute sets regardless of what each of the attribute sets relate to, that is whether an attribute set is a resource description for a real-world resource, a description of a virtual construct, a set of modifying attribute values for overwriting values in a description, etc.

It will be appreciated that many variants are possible to the above described embodiments of the invention.

The invention claimed is:

1. A computer program product within a computer readable medium for combining first and second attribute sets, each comprising at least one attribute and value pair comprising a named attribute assigned a value that comprises one of a first value and another attribute set in addition to the first and second attribute sets; the computer program product comprising:

instructions arranged to control the operation of a computing apparatus running the program product to cause the apparatus to carry out a merge operation to generate a merged attribute set by applying to the first and second attribute sets, as items-to-be-merged, a merge operator by which:

where at least one of the items-to-be-merged is a said first value, the value of the merged items is the value of one of the items-to-be-merged; and where both first and second attribute sets, as items-to-be-merged, are attribute sets, the value of the merged items comprises:

the attribute and value pairs of attributes that occur in only one of the items-to-be-merged, and attribute and value pairs for attributes occurring in both items-to-be-merged with the value of each such pair being the value resulting from the application of the merge operator to the values of the attribute appearing in each item-to-be-merged, the merge operator being recursively applied as required to merge the attribute values.

2. The computer program product according to claim 1, wherein where at least one said attribute is assigned a value that is a reference to a said named attribute, the merge operation comprises repeatedly carrying out the following steps (a) and (b) in succession:

(a) recursively applying the merge operator until a reference is encountered as a said item-to-be-merged; and (b) de-referencing an encountered reference by:

(i) where the reference is to a named attribute to which a first value or attribute set is assigned, copying that value or set; and (ii) where the reference is to the start of a chain of two or more references each pointing to a respective named attribute the value of which is the next reference in the chain with the chain ending when a reference in the chain points to a named attribute to which a first value or attribute set is assigned, following the chain of references and copying the first value or set at the end of the chain.

3. The computer program product according to claim 1, wherein where at least one conformance predicate is associated with at least one of said first and second attribute sets, the program product is arranged to cause the computing apparatus, in carrying out the merge operation, to carry across to the resulting set produced by the merge operation all the conformance predicates associated with the first and second sets.

4. The computer program product according to claim 3, wherein the program product is arranged to cause the computing apparatus to evaluate, following the merge operation, the or each conformance predicate associated with the resultant set.

5. The computer program product according to claim 1, wherein where a group of one or more identifiers is associated with each of the first and second sets, the program product is arranged to cause the computing apparatus, in carrying out the said merge operation on the first and second sets, to create a group of identifiers for the set produced by the merge operation, this group comprising a unique identifier for the set and the identifiers contained in the group of identifiers of the first and second sets.

6. The computer program product according to claim 5, wherein the program product is arranged to cause the computing apparatus to test the provenance of one said set produced by the merge operation by comparing an associated group of identifiers of said one set with the group of identifiers of another said set, said one set being determined as being derived from said other set when all the identifiers of the group of identifiers associated with said other set are contained in the group of identifiers associated with said one set.

7. The computer program product according to claim 1, wherein where at least one said attribute is assigned a value that is a reference to a said named attribute and a group of one or more identifiers is associated with each of said first and second sets, the program product is arranged to cause the computing apparatus, in carrying out the said merge operation on the first and second sets: whenever a reference is resolved by copying a set, to associate a group of identifiers with the copy, this group comprising a new unique identifier for the copy and the identifiers of the group of identifiers of the set that has been copied; and to create a group of identifiers for the set produced by the merge operation, this group comprising a said unique identifier for the set and the identifiers contained in the group of identifiers of the first and second sets.

8. The computer program product according to claim 7, wherein the program product is arranged to cause the computing apparatus to test the provenance of one said set by comparing an associated group of identifiers of said one set with the group of identifiers of another set, said one set being determined as being derived from said other set when all the identifiers of the group of identifiers associated with said other set are contained in the group of identifiers associated with said one set.

9. The computer program product according to claim 1, wherein the program product is arranged to cause the computing apparatus to carry out the merge operation in respect of at least one other attribute set in addition to said first and second attribute sets, the merge operation being effected first on said first and second attribute sets and then the resultant set being merged with a first of the other sets, and the set so produced being merged with any remaining other set in a recursive manner.

10. The computer program product according to claim 1, wherein the first attribute set is a resource description, the second attribute set being combined with the resource description by the merge operator to set preselected first values for at least one of the attributes of the resource description.

11. The computer program product according to claim 1, wherein both the first and second attribute sets are resource descriptions, these descriptions being combined by the merge operator to form a resource description for a new resource that includes the attributes of both the first and second resource descriptions.

12. Computer apparatus for combining first and second attribute sets each comprising at least one attribute and value pair by which a named attribute is assigned a value that comprises one of a first value and another attribute set in addition to the first and second attribute sets; the apparatus comprising a set merging arrangement for carrying out a merge operation to generate a merged attribute set, the set merging arrangement comprising: merge operator means for applying a merge operator to items to be merged, and control means for controlling the carrying out of said merge operation, the control means being arranged to apply said first and second attribute sets, as items to be merged, to the merge operator means; the merge operator means comprising: first means operative, where at least one of the items to be merged is a said first value, to cause the value of the merged items to be the value of one of the said items to be merged; and second means, operative where both first and second attribute sets, as items to be merged, are attribute sets, to cause the value of the merged items to comprise: the attribute and value pairs of attributes that occur in only one of the items-to-be-merged, and attribute and value pairs for attributes occurring in both items to be merged with the value of each such pair being the value resulting from the application of the merge operator to the values of the attribute appearing in each item to be merged, the control means causing the merge operator to be recursively applied by merge operator means as required to merge the attribute values.

* * * * *